United States Patent [19]

Edblad et al.

[11] Patent Number: 5,305,314
[45] Date of Patent: Apr. 19, 1994

[54] GLOBAL LOAD SMOOTHING IN A REAL TIME DATA IMAGING NETWORK SYSTEM

[75] Inventors: Warren A. Edblad, Plum Boro; Linda L. Santoline, South Park; Carl J. Staab; Charles W. Einolf, Jr., both of Murrysville; Albert W. Crew, Monroeville, all of Pa.

[73] Assignee: Westinghouse Electric Corp., Pittsburgh, Pa.

[21] Appl. No.: 901,445

[22] Filed: Jun. 19, 1992

[51] Int. Cl.5 ............................................. H04J 3/16
[52] U.S. Cl. ................................... 370/79; 370/85.5; 340/825.05; 359/119
[58] Field of Search ................. 370/79, 84, 85.1, 85.2, 370/85.4, 85.5, 85.12, 85.15; 340/825.05; 359/119

[56] References Cited

U.S. PATENT DOCUMENTS

| | | | |
|---|---|---|---|
| 4,068,098 | 1/1978 | Thyselius | 370/84 X |
| 4,460,994 | 7/1984 | Scanlon et al. | 370/85.7 |
| 4,547,877 | 10/1985 | Lehman et al. | 370/84 X |
| 4,646,290 | 2/1987 | Hills | 370/84 |
| 4,651,317 | 3/1987 | Tashiro et al. | 370/85.15 |
| 4,697,263 | 9/1987 | Beaufoy | 370/85.1 |
| 4,769,839 | 9/1988 | Preineder et al. | 370/85.7 |
| 4,792,944 | 12/1988 | Takahashi et al. | 370/84 |
| 4,866,704 | 9/1989 | Bergman | 370/85.5 X |
| 4,949,336 | 8/1990 | Hamada et al. | 370/85.2 |
| 5,214,649 | 5/1993 | Van As et al. | 370/85.15 X |

FOREIGN PATENT DOCUMENTS

0221708 10/1986 United Kingdom.

Primary Examiner—Benedict V. Safourek
Assistant Examiner—Melvin Marcel
Attorney, Agent, or Firm—P. C. Watkins

[57] ABSTRACT

Real time periodic messages generated by a plurality of stations on a data communication network and having data periods ranging from a shortest to a longest, where the longest data period is an integer multiple of all the others, are assigned by a server station to transmit time slots, equal in duration to the shortest data period, on a global basis to minimize the number of messages transmitted by all stations during each transmit time slot.

15 Claims, 9 Drawing Sheets

| | 1 Second | | | | | | | | | |
|---|---|---|---|---|---|---|---|---|---|---|
| 100 ms | | | | | | | | | | |
| | 1 | 2 | 3 | 4 | 5 | 6 | 7 | 8 | 9 | 10 |
| | $p_1$ | $p_1$ | $p_1$ | $p_1$ | $p_1$ | $p_1$ | $p_1$ | $p_1$ | $p_1$ | $p_1$ |
| | $p_2$ | $p_2$ | $p_2$ | $p_2$ | $p_2$ | $p_2$ | $p_2$ | $p_2$ | $p_2$ | $p_2$ |
| | $p_3$ | $p_3$ | $p_3$ | $p_3$ | $p_3$ | $p_3$ | $p_3$ | $p_3$ | $p_3$ | $p_3$ |
| | $p_4$ | $p_4$ | $p_4$ | $p_4$ | $p_4$ | $p_4$ | $p_4$ | $p_4$ | $p_4$ | $p_4$ |
| | $p_5$ | $p_5$ | $p_5$ | $p_5$ | $p_5$ | $p_5$ | $p_5$ | $p_5$ | $p_5$ | $p_5$ |
| | $10p_1$ | | | | | | | | | |
| | $10p_2$ | | | | | | | | | |
| | $10p_3$ | | | | | | | | | |
| | $10p_4$ | | | | | | | | | |
| | $10p_5$ | | | | | | | | | |

FIG. 4

| | 1 Second | | | | | | | | | |
|---|---|---|---|---|---|---|---|---|---|---|
| 100 ms | | | | | | | | | | |
| | 1 | 2 | 3 | 4 | 5 | 6 | 7 | 8 | 9 | 10 |
| | $p_1$ | $p_1$ | $p_1$ | $p_1$ | $p_1$ | $p_1$ | $p_1$ | $p_1$ | $p_1$ | $p_1$ |
| | $p_2$ | $p_2$ | $p_2$ | $p_2$ | $p_2$ | $p_2$ | $p_2$ | $p_2$ | $p_2$ | $p_2$ |
| | $p_3$ | $p_3$ | $p_3$ | $p_3$ | $p_3$ | $p_3$ | $p_3$ | $p_3$ | $p_3$ | $p_3$ |
| | $p_4$ | $p_4$ | $p_4$ | $p_4$ | $p_4$ | $p_4$ | $p_4$ | $p_4$ | $p_4$ | $p_4$ |
| | $p_5$ | $p_5$ | $p_5$ | $p_5$ | $p_5$ | $p_5$ | $p_5$ | $p_5$ | $p_5$ | $p_5$ |
| | $10p_1$ | $10p_2$ | $10p_3$ | $10p_4$ | $10p_5$ | | | | | |

| | 1 | 2 | 3 | 4 | 5 | 6 | 7 | 8 | ••• | R-1 | R |
|---|---|---|---|---|---|---|---|---|---|---|---|
| | $p_1$ | $p_1$ | $p_1$ | $p_1$ | $p_1$ | $p_1$ | $p_1$ | $p_1$ | ••• | $p_1$ | $p_1$ |
| | $p_2$ | $p_2$ | $p_2$ | $p_2$ | $p_2$ | $p_2$ | $p_2$ | $p_2$ | ••• | $p_2$ | $p_2$ |
| | $p_3$ | $p_3$ | $p_3$ | $p_3$ | $p_3$ | $p_3$ | $p_3$ | $p_3$ | ••• | $p_3$ | $p_3$ |
| | ⋮ | ⋮ | ⋮ | ⋮ | ⋮ | ⋮ | ⋮ | ⋮ | ••• | ⋮ | • |
| | $p_7$ | $p_7$ | $p_7$ | $p_7$ | $p_7$ | $p_7$ | $p_7$ | $p_7$ | ••• | $p_7$ | $p_7$ |
| | $2p_1$ | $2p_2$ | $2p_1$ | $2p_2$ | $2p_1$ | $2p_2$ | $2p_1$ | $2p_2$ | ••• | $2p_1$ | $2p_2$ |
| | $2p_3$ | $2p_4$ | $2p_3$ | $2p_4$ | $2p_3$ | $2p_4$ | $2p_3$ | $2p_4$ | ••• | $2p_3$ | $2p_4$ |
| | $2p_5$ | $2p_6$ | $2p_5$ | $2p_6$ | $2p_5$ | $2p_6$ | $2p_5$ | $2p_6$ | ••• | $2p_5$ | $2p_6$ |
| | $2p_7$ | | $2p_7$ | | $2p_7$ | | $2p_7$ | | ••• | $2p_7$ | |
| | $5p_1$ | $5p_2$ | $5p_3$ | $5p_4$ | $5p_5$ | $5p_1$ | $5p_2$ | $5p_3$ | ••• | $5p_4$ | $5p_5$ |
| | $5p_6$ | $5p_7$ | | | | $5p_6$ | $5p_7$ | | | | |
| | $Rp_1$ | $Rp_2$ | $Rp_3$ | $Rp_4$ | $Rp_5$ | $Rp_6$ | $Rp_7$ | | | | |

Largest Period Rp

Shortest Period p

GLOBAL LOAD SMOOTHING IN A REAL TIME DATA IMAGING NETWORK SYSTEM

BACKGROUND

1. Field of the Invention

This invention relates to the transmission of periodic data in a real time data imaging network system, and more particularly, in such a system in which different data messages are repetitively transmitted at different periodic rates.

2. Background Information

In a real time or deterministic data imaging network system, data messages containing current images of specific data are periodically transmitted by stations on the network to the other stations. Data latency, that is the maximum time period in which the data must be updated at receiving stations, determines the periodic rate at which messages must be transmitted. Periodic rate in turn determines the amount of message traffic that must be handled by the system.

A network conforming to the FDDI (fiber distribution data interchange) standard is an example of a network which can be utilized as a real time data network. The FDDI protocol defines a ring topography and utilizes a token passing scheme in which a token is passed from station to station to allocate transmission time on the network. On an FDDI network, traffic is controlled by allocating messages to one of two classes: synchronous and asynchronous. The synchronous class of messages is used for periodic data, because it guarantees a maximum data latency equal to twice the target token rotation time (TTRT) where the TTRT is selected to achieve the required performance in the time domain. For example, if a maximum data latency of 100 milliseconds is required, the TTRT is selected to be 50 milliseconds. The TTRT then determines the maximum amount of traffic which can be broadcast on the network, because in the worst case, all on the network must be capable of broadcasting their synchronous mode messages and passing the token within the TTRT.

In some real time systems, such as for example, a real time control system, there are often data which must be updated at a high data rate for appropriate control. Normally, most of the data in the system has a much longer latency requirement, and can in fact have varying latency requirements. In such a non-homogeneous system, the capacity of the network is constrained by the periodic data having the smallest broadcast period. This is because the peak loading occurs when all nodes on the network simultaneously require the token to transmit all of their periodic data during a single token rotation.

There is a known real time token passing network system in which periodic data is transmitted at one of two rates, a fast rate (having a short period) and a slow rate (having a longer period). The short period data is transmitted during every token rotation. Each station individually, and without regard to the messages transmitted by the other stations, distributes its periodic data messages having the longer period over the number of short data periods contained within the longer data period. Thus, each station tries to average out its own messages of the longer period. The effectiveness of this scheme is related to the number and length of the messages being transmitted. For example, if, within each station, the number of messages with the longer data period to be transmitted is equal to the ratio of the longer data period to the shorter data period, an equal number of longer data period messages would be transmitted in each of the shorter data periods, and therefore, the message traffic would be fully averaged out. For a network having very short messages, such a scheme is usually effective for providing smoothing across the entire network. However, as message sizes increase, it becomes more unlikely that such averaging within a station will provide effective smoothing. In the worst case, each station may have only a single long data period message and, there can be no averaging. Since all of the stations are distributing their long period messages independently, in the worst case, each station could transmit its one long data period message in the same short period.

There is another known real-time token passing network protocol, known as FDDI, which permits periodic, or synchronous, data to be transmitted at one of many periodic rates. The FDDI protocol does not have any provisions for smoothing synchronous data of differing periods, either within a station or across the entire network. Thus, the worst case (peak loading) occurs when all synchronous data from all stations on the network transmit their synchronous mode messages in a single token rotation. The likelihood of such an occurrence is compounded by the fact that each station generally transmits only a few messages which are relatively large in size. This is a case because the FDDI network is a very high throughput data network (100 Megabits per second). In such a network, software processing times generally dictate the performance; although the network can sustain a very high transmission rate, it cannot sustain a very high message rate, since each message must be processed by software. Therefore, it is very likely that the messages from each station on the network are constrained to be a certain minimum size, and that individual data entities are grouped into a single message. As a result, an FDDI network having multiple synchronous data periods has very uneven loading, and also has reduced capacity, since the capacity is determined by the worst case synchronous data traffic in a single token rotation.

There is a need therefore for a system which more effectively distributes long period data in systems with multiple data periods.

SUMMARY OF THE INVENTION

This need and others are satisfied by the invention which is directed to a real time imaging network system which distributes longer period data messages on a system-wide basis to minimize the data transmitted in any particular shortest data period. More particularly, the invention is directed to a system in which there are data messages having data periods which range from a shortest data period to a longest data period, with the longest data period being an integer multiple of each of the shorter data periods. The traffic within the systems is then distributed across the longest data period, which is divided into a number of "transmit time slots" equal to the rates between the longest and shortest data periods. The system further includes means which sequentially enable, within repetitive transmit time slots, transmission by each station of periodic data messages on a data communications network linking all of the stations, with the transmit time slots being equal in duration to the shortest data period.

Each station repetitively transmits, when enabled during every transmit time slot, the periodic data messages having the shortest data period. Each station also repetitively transmits the other data messages with longer data periods, when enabled during transmit time slots spaced for each other data message by a ratio of the data period for the other periodic data message to the shortest data period. Furthermore, the transmission of the data messages with similar, longer data periods in all stations, is distributed over transmit time slots contained within each longest data period in order to minimize the number of data messages transmitted by all the stations during each transmit time slot. Preferably, transmission of data messages in each station is enabled by a token passing system, which is, in the most preferred embodiment of the invention, an FDDI network.

Distribution of the transmission of data messages with similar, longer data periods is accomplished in the preferred embodiment of the invention by means of a server station on the network. The server station includes means which sequentially assigns each of the periodic data messages from all stations sequentially a starting transmit time slot. The server then also assigns each periodic data message to additional time slots spaced apart from the starting transmit time slot by a period transmit spacing equal to the ratio of the data period of the periodic message to the shortest data period.

The invention embraces both the system and method for transmitting real time data messages with varying data periods.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
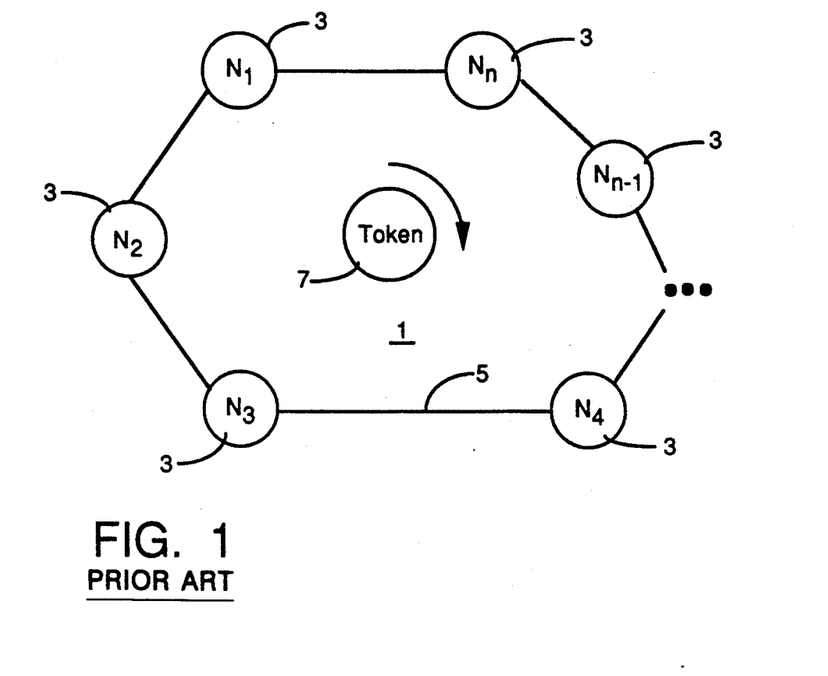
FIG. 1 is a schematic diagram of a token passing, ring architecture network system to which the invention is applied.

FIG. 1 illustrates a real time data imaging network system 1 which includes a plurality of stations 3 interconnected by a data communications network 5. A token, represented symbolically at 7, passed by the network from station to station allocates the right to transmit to each station sequentially during repetitive token rotations so the station may transmit on the network. At least one, but possibly several token rotations can occur during the duration of a single transmit time slot. Each station transmits its data assigned to a transmit time slot only once during that time slot, regardless of the actual number of token notions. In the exemplary form of the invention, the network connects the stations 3 in a ring configuration. Preferably, the network 5 utilizes the FDDI (fiber distribution data interchange) network standard. This is an open architecture standard. As previously mentioned, the FDDI network can transmit synchronous and asynchronous messages. The real time data which must be updated periodically is transmitted in the synchronous mode of the FDDI network. As different data in a system 1 have different data latencies, that is different maximum times during which the data must be updated at all receiving stations on the network, a plurality of data periods are established ranging from a shortest data period to a longest data period. These data periods are established such that the longest data period is an integer multiple of each of the shorter data periods.

Figure 2:
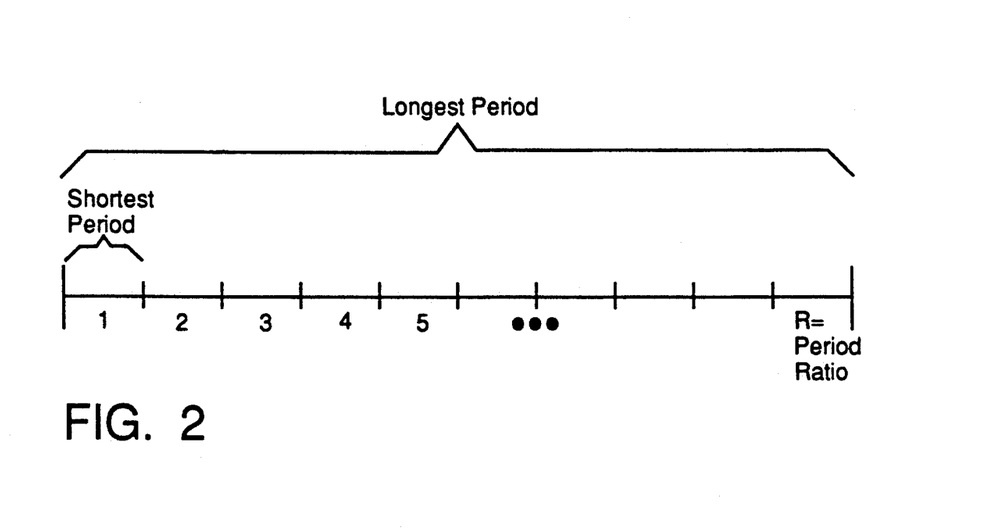
FIG. 2 is a diagram illustrating time division in accordance with the invention.

FIG. 2 illustrates this relationship of the longest to shortest data period. The period ratio, R, is the ratio of the longest data period to the shortest data period. The shortest data period is equal to the duration of the transmit time slots on the network. There are R transmit time slots contained in the longest data period. Thus, as the token is passed during each transmit time slot, each station transmits its data with the shortest data period. Each station must also transmit, while it has the token, some of its data with longer periods. It is apparent that the transmit time slot, and therefore, the shortest data period determines the amount of data that can be handled by the network since each station must transmit its data and pass the token during the transmit time slot. While the data with the shortest data period must be transmitted during every transmit time slot, the data with longer data periods can be spread out over transmit time slots extending over the longest data period.

In accordance with the invention, data with data periods other than the shortest data period are distributed on a system wide basis over the longer data period to average out the amount of data that is transmitted during a single transmit time slot. An example of the effect of the invention is illustrated by FIGS. 3 and 4 for a network system having five stations or nodes, i, and two data periods, a short data period p which may be, for instance, 100 milliseconds, and a long data period $10p$, which in the example, would be one second.

Figure 3:
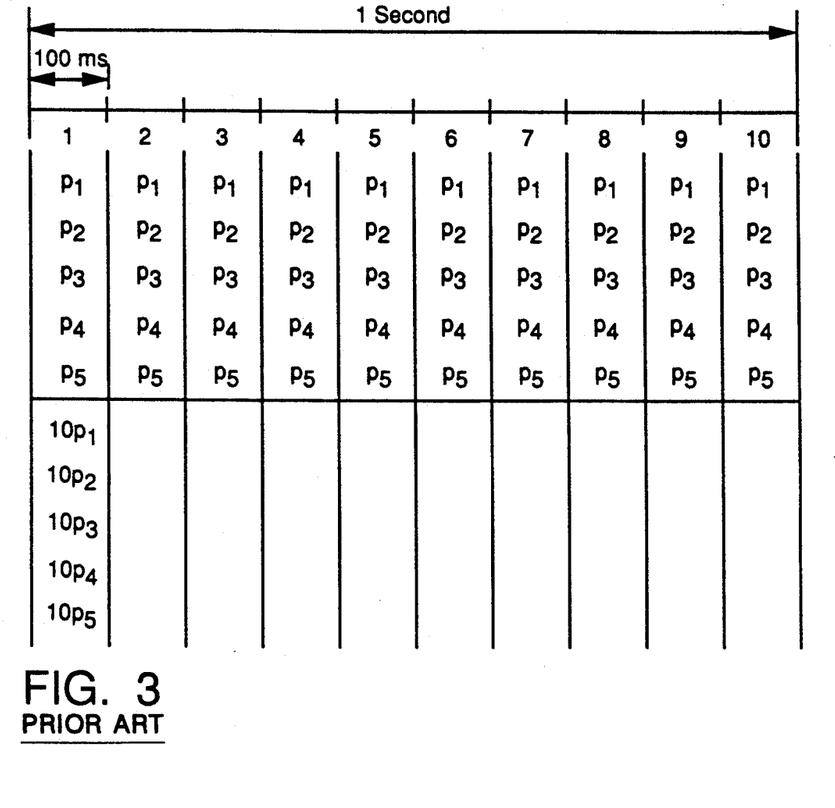
FIG. 3 is a chart illustrating peak loading on a single time slot for a network system such as shown in FIG. 1 having two transmission periods which does not incorporate the invention.

FIG. 3 illustrates peak loading, or the worst case situation, for the network of the example without the benefit of the invention. In this figure, $p_i$, represents one block of 100 millisecond data from station or node i and $10p_i$ represents one block of one second data from the station or node i. As can be seen from FIG. 3, each station transmits its 100 millisecond data during each token rotation or transmit time slot 1-10. Under the prior art system where each station or node allocates its one second data to one of the transmit time slots 1-10 independently, the system must accommodate for the worst case scenario in which all of the stations transmit their one second data during the same token rotation or time slot. In FIG. 3, this is the first time slot during each set of ten time slots. It can be appreciated, therefore, that the total amount of data must be constrained so that it can all be transmitted within one time slot.

Figure 4:
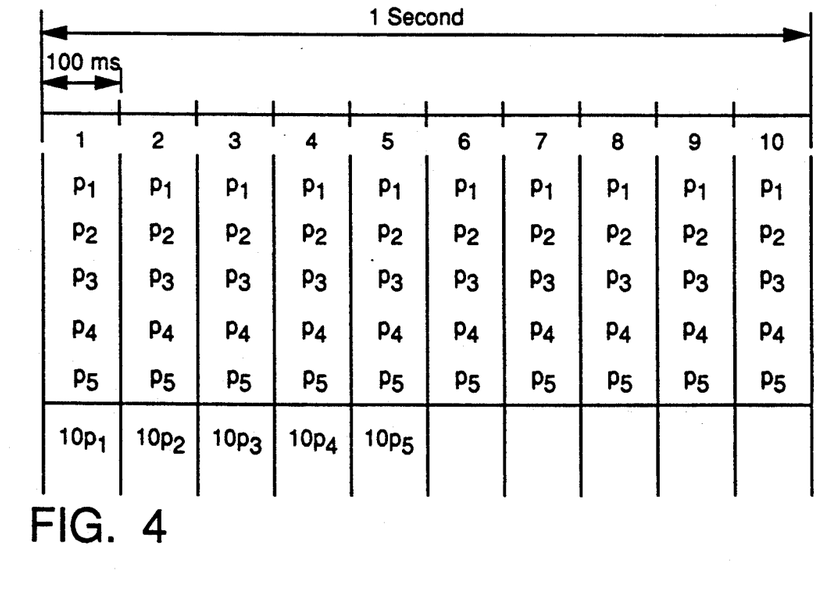
FIG. 4 is a chart illustrating peak loading in a single time slot for the network of FIG. 1 with two data transmission periods and incorporating the invention.

FIG. 4 illustrates the same example to which the invention has been applied. In this case, allocation of the transmission of data in each station with the longer data period is distributed on a global basis so that each station transmits its one second data in a different time slot during each set of ten time slots. Thus, the amount of data that must be transmitted in any particular time slot is minimized. With the invention then, more data can be transmitted during a given transmit time slot increasing the overall network capacity, or on the other hand, the duration of the transmit time slot can be shortened so that the shortest data period can be reduced for more frequent update of data with the shortest data period.

Figure 5:
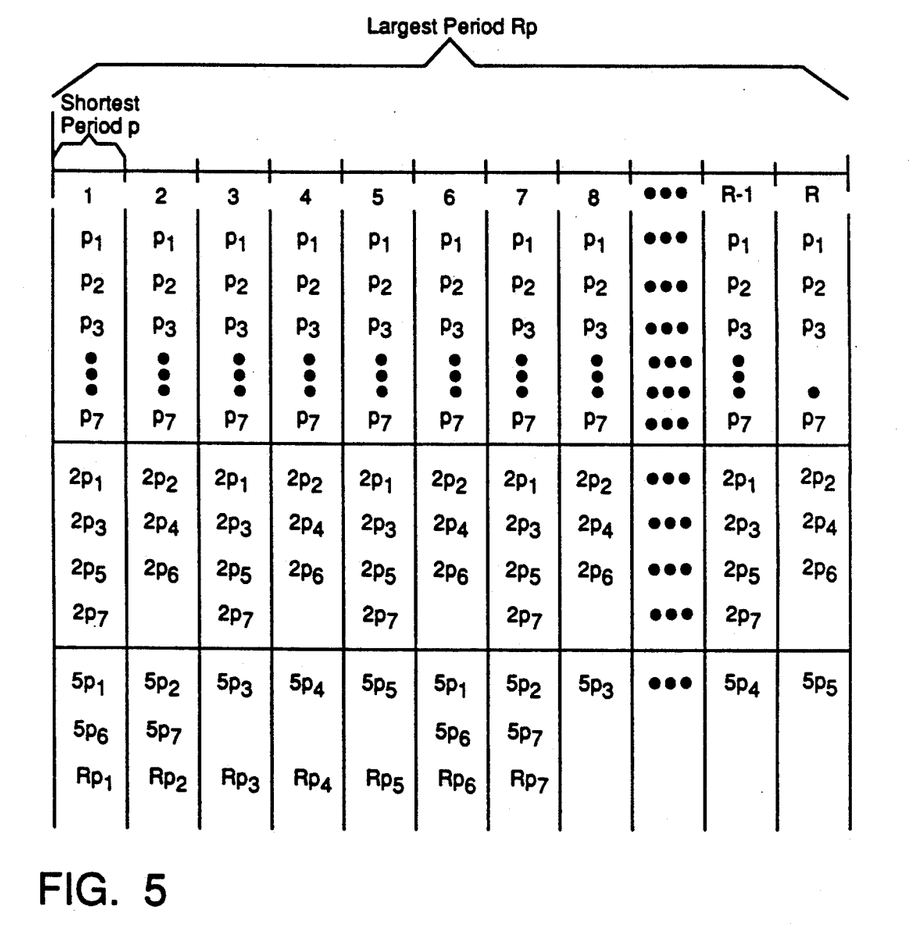
FIG. 5 is a chart illustrating peak loading in accordance with the invention for the general case of a network such as shown at FIG. 1 having multiple data transmitting periods.

FIG. 5 illustrates the general case of the application of the invention wherein there are data with more than two different data periods. In FIG. 5, $p_i$, $2p_i$, $5p_i$, and $Rp_i$ represent respectively one block of data of each given broadcast period from the station or node i. Again R is the ratio of the longest period to the shortest period and R is an integer multiple of all periods. In this example, the number of stations or nodes is 7 and R is greater than 7. Again, the $p_i$ data is transmitted during every token rotation. The $2p_i$ data is transmitted every other transmit time slot, the $5p_i$ data is transmitted every fifth data period and $Rp_i$ data is transmitted once every R time periods. It can be appreciated from this example, that global smoothing effected by the invention greatly increases the capacity of the network, as the amount of data that could be transmitted without global smoothing would be limited because the system would have to allow for the worst case of transmission by each station of all data of all data periods greater than the shortest data period during one token rotation or transmit time slot.

Figure 6:
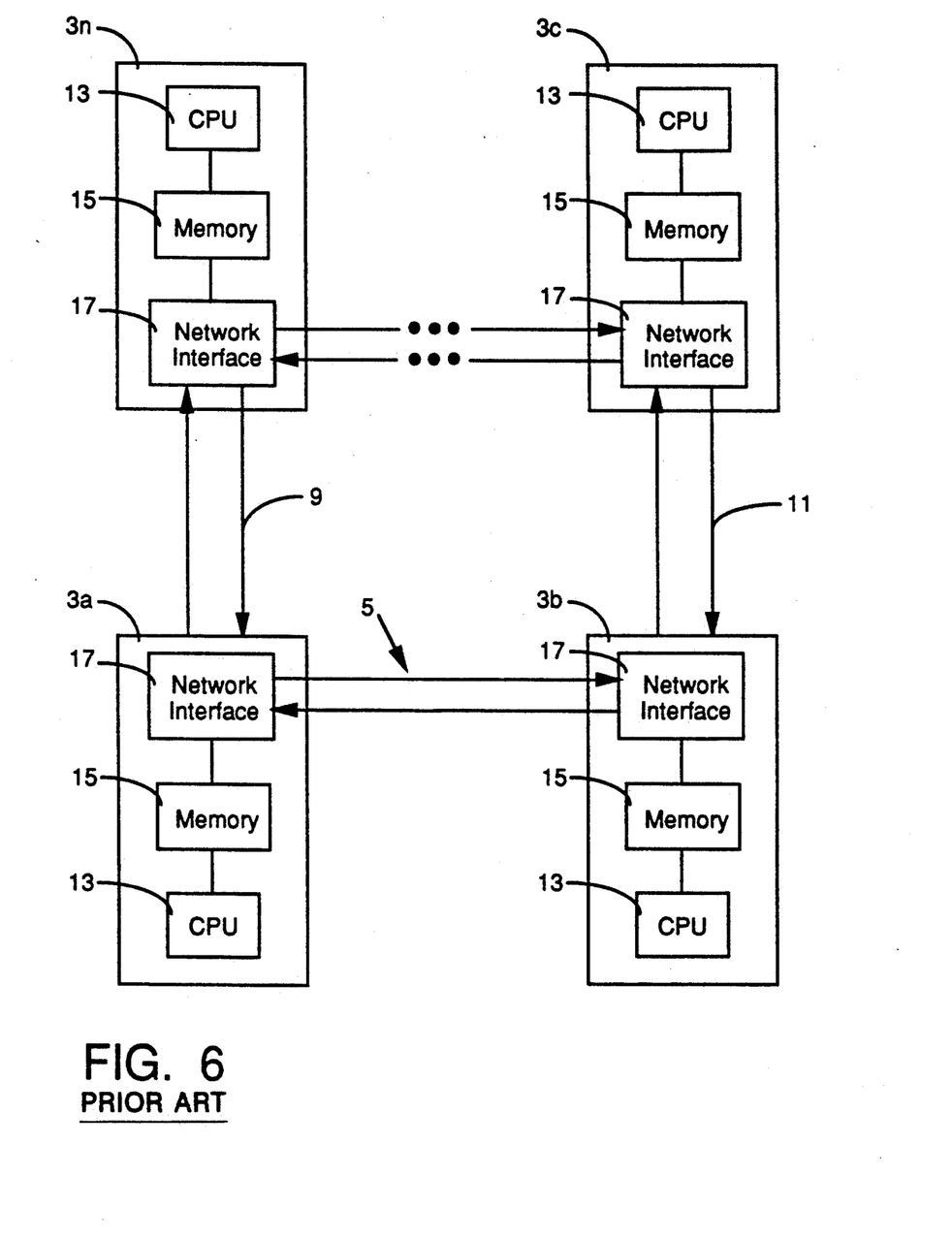
FIG. 6 is a schematic diagram of an FDDI network system to which the invention is applied.

FIG. 6 illustrates application of the invention to a real time data imaging network 1 having a number of stations 3a-3n connected by a network 5 in a ring configuration with counter-rotating inner and outer rings 9 and 11 utilizing the FDDI standard. Each of the stations 3a-3n includes a central processing unit (CPU) 13, a memory 15, and a network interface 17. Messages generated by the CPU 13 in each station are transmitted by the network interface 17 on the inner and outer ring 9 or 11 of the network 5 as determined by a station management protocol level of the FDDI network when the network interface receives the token. When the network interface of the adjacent station receives the message, it stores the needed data in the memory 15 and repeats the message to the next (downstream) station. In this manner, the data is transmitted around the ring to all of the stations. In this system, each data message is a block of data generated by the originating transmitting station.

In accordance with the invention, one of the stations, such as the station 3a, is a server node. The server node is the central point for assigning data blocks generated by each of the individual stations to transmit time slots to effect the global smoothing. Thus, when one of the stations assembles a new block of data with a specified data period, it sends a request to the server node 3a for assignment of transmit time slots for that data block. A simple scheme for the server 3a to allocate time slots to data blocks is for the server to assign the first longer data block for which time slots are requested to the first time slot as a starting time slot. Additional time slots spaced from the starting time slot by the ratio of the data period for this block of data to the shortest data period are also allocated to the data block. The starting time slot is then incremented by one for the next data block for which time slot allocation is requested. When the appropriate number of time slots have been allocated to the data block, the list of assigned time slots is then transmitted back to the requesting station.

Figure 7A:
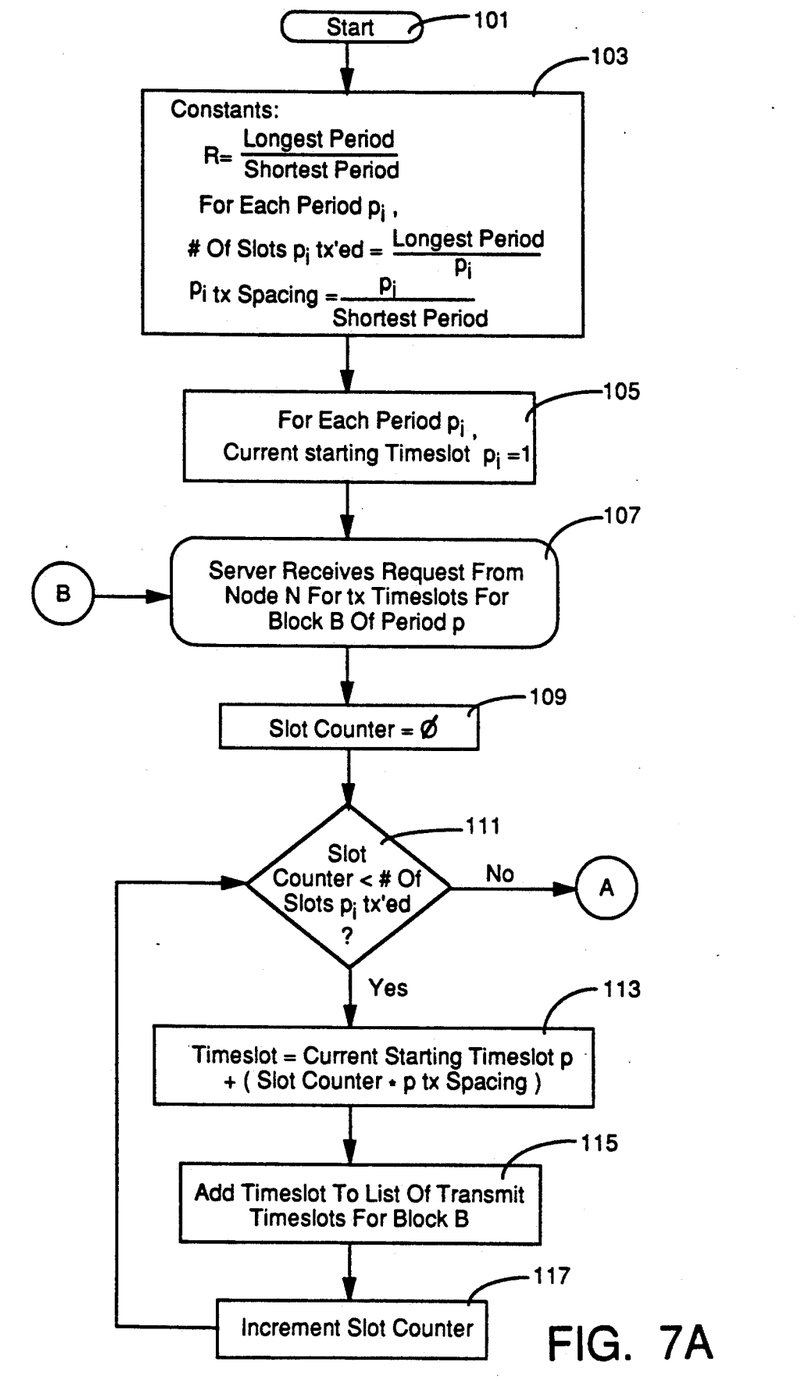
FIGS. 7A and 7B illustrate a flow chart of a suitable program for use by a server in allocating data for transmission during specific transmit time slots in accordance with the invention for the general case of multiple data periods.
Figure 7B:
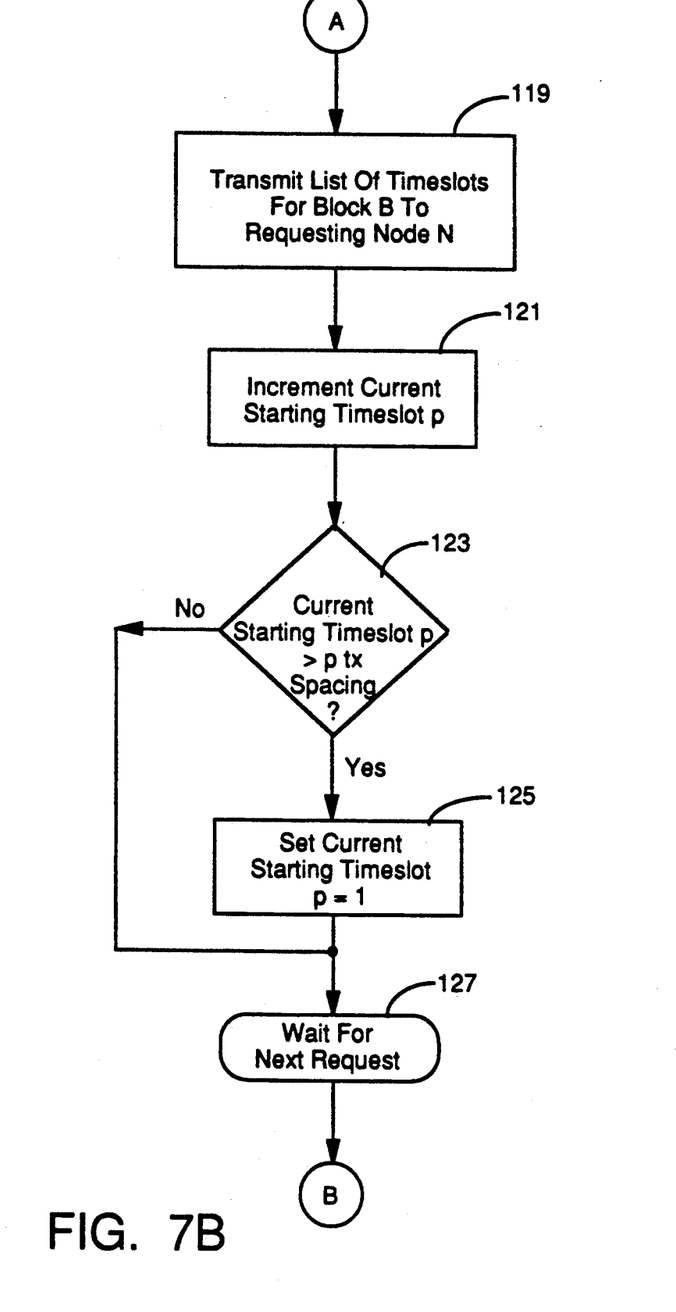

A flow chart 100 for a suitable computer program for the server station for the general case of a plurality of n-stations or nodes transmitting data blocks having a number of different data periods is shown in FIGS. 7A and 7B. Upon being called at 101, the program initializes constants required for time slot allocation at 103. These constants include R which is the ratio of the longest period to the shortest period. The number of slots in which data is to be transmitted during the longest period is calculated for each data period by dividing that data period into the longest data period. A transmission time slot spacing is also established for each period by dividing that data period by the shortest data period. Initialization is completed at 105 by initializing a starting time slot to be allocated network-wide for each data period.

Upon receipt by the server station at 107 of a request for time slot allocation from a station on the network, the server initializes at 109 a slot counter used in allocation. This slot counter, as will be seen, is incremented from zero to the number of slots a block of data B of period p is transmitted minus 1. The routine then enters a loop at 111 to allocate time slots to that block of data. If the slot counter count remains less than the number of slots in which the block of data is to be transmitted during each longest data period, as determined at 111, the current time slot for this block of data is calculated at 115. This current time slot is added to the list of transmit time slots for the block of data B at 113 and the slot counter is incremented at 117. This allocation of transmit time slots to the block of data B is repeated until it has been assigned the number of time slots established for its data period back at 103.

When the block of data B has been assigned to its full complement of transmit time slots as determined at 111, the list of time slots for that block of data is transmitted to the requesting station at 119. The current starting time slot for blocks of data of that data period is then incremented at 121 for the next allocation of time slots for a block of data of this period. A check is then made at 123 to determine if this new current starting time slot is greater than the time slot spacing for this data period as determined 103. If it is, then the current starting time slot is reset to 1 at 125. In either case, the server waits for the next request for allocation of time slots at 127, when that request is received the allocation process repeats at 107.

Figure 8A:
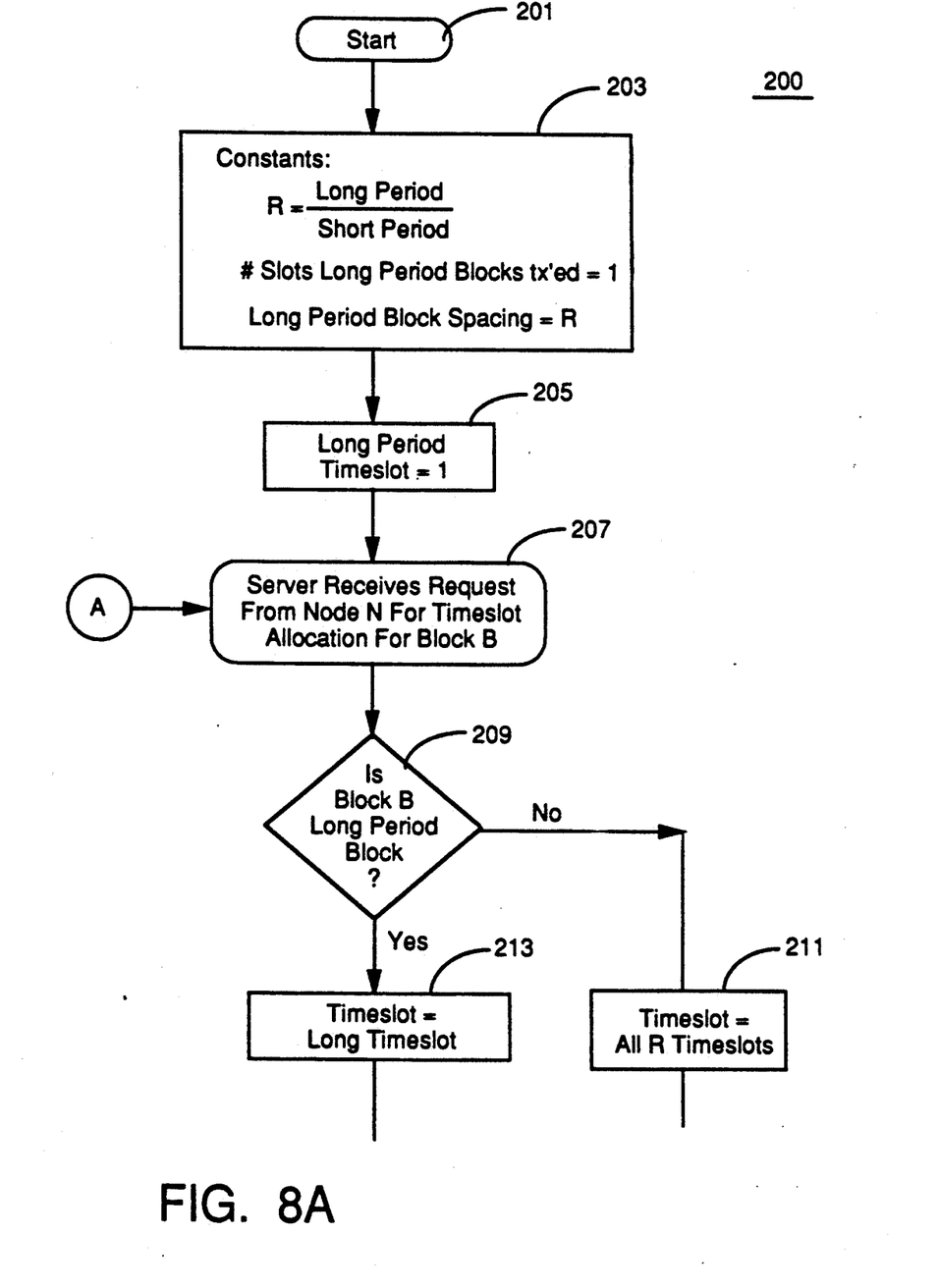
FIGS. 8A and 8B illustrate a flow chart of a suitable computer program for allocation of data for transmission during specific transmit time slots for the special case in which there are only two data periods.
Figure 8B:
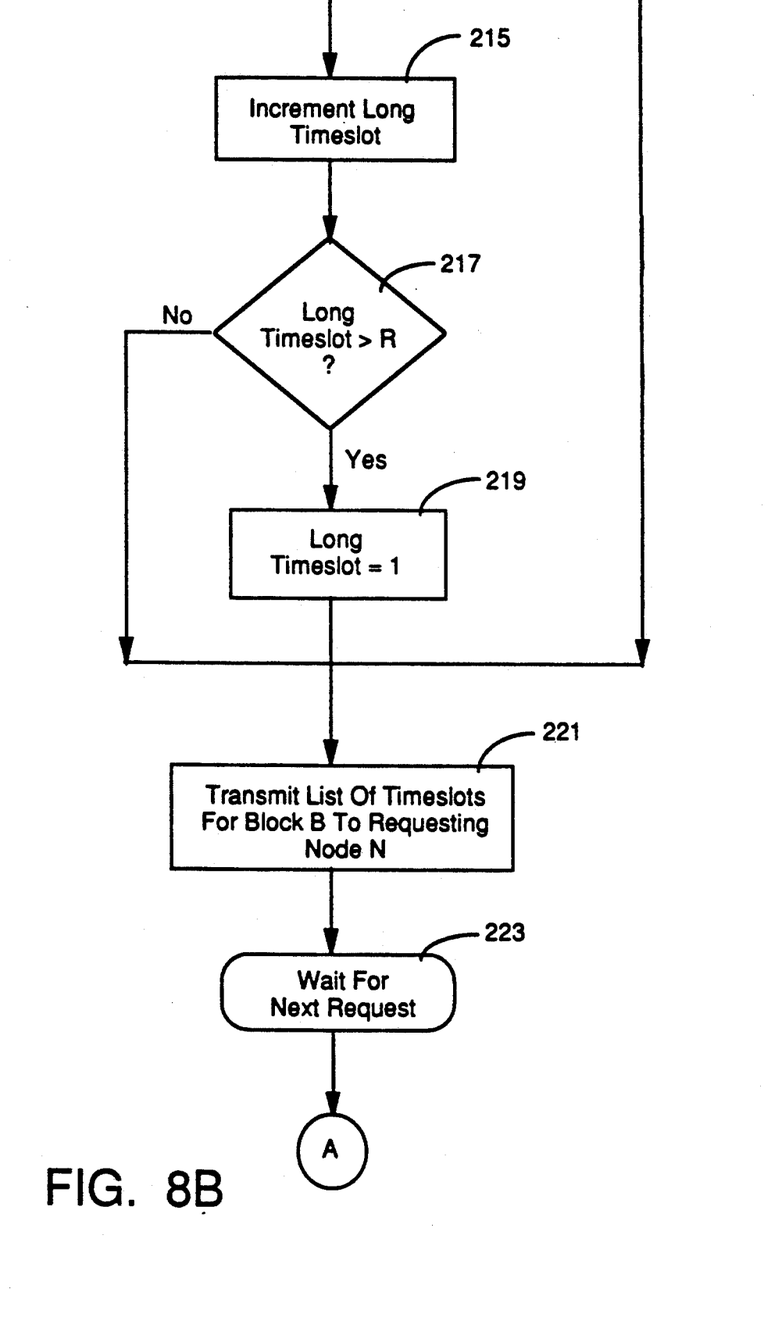

FIGS. 8A and 8B illustrate a flow chart for a suitable computer program for allocation of time slots by a server in the special case where there are only two data periods in the network, a short period and a long period. When called at 201, the server routine 200 initializes the constants needed for time slot allocation at 203. These constants are reduced to R, the ratio of the long period to the short period, the number of slots that the blocks of data with the long data period are transmitted within the longest data period which is, of course, 1, and the transmit spacing for blocks of data with the long data period, which is equal to R. Initialization also includes setting the time slot for the long data period equal to 1 at 205.

When the server receives at 207 a request from a station for time slot allocation for a block of data B, the data period, as designated by the requesting station, is checked at 209. If the block of data B has the short data period, it is assigned at 211 for transmission during all of the time slots R in the long data period.

On the other hand, if it is determined at 209 that the data block B has the long data period, it is assigned the long data period time slot for its transmit time slot at 213. The long data period time slot is then incremented at 215. If the new long data period time slot as incremented exceeds the total number R of transmit time slots in the long data period as determined at 217, the long data period starting time slot is reset to one at 219. Next, the list of time slots to which the block B is assigned is transmitted to the requesting station at 221. The routine then waits for the next request for allocation at 223.

Figure 9:
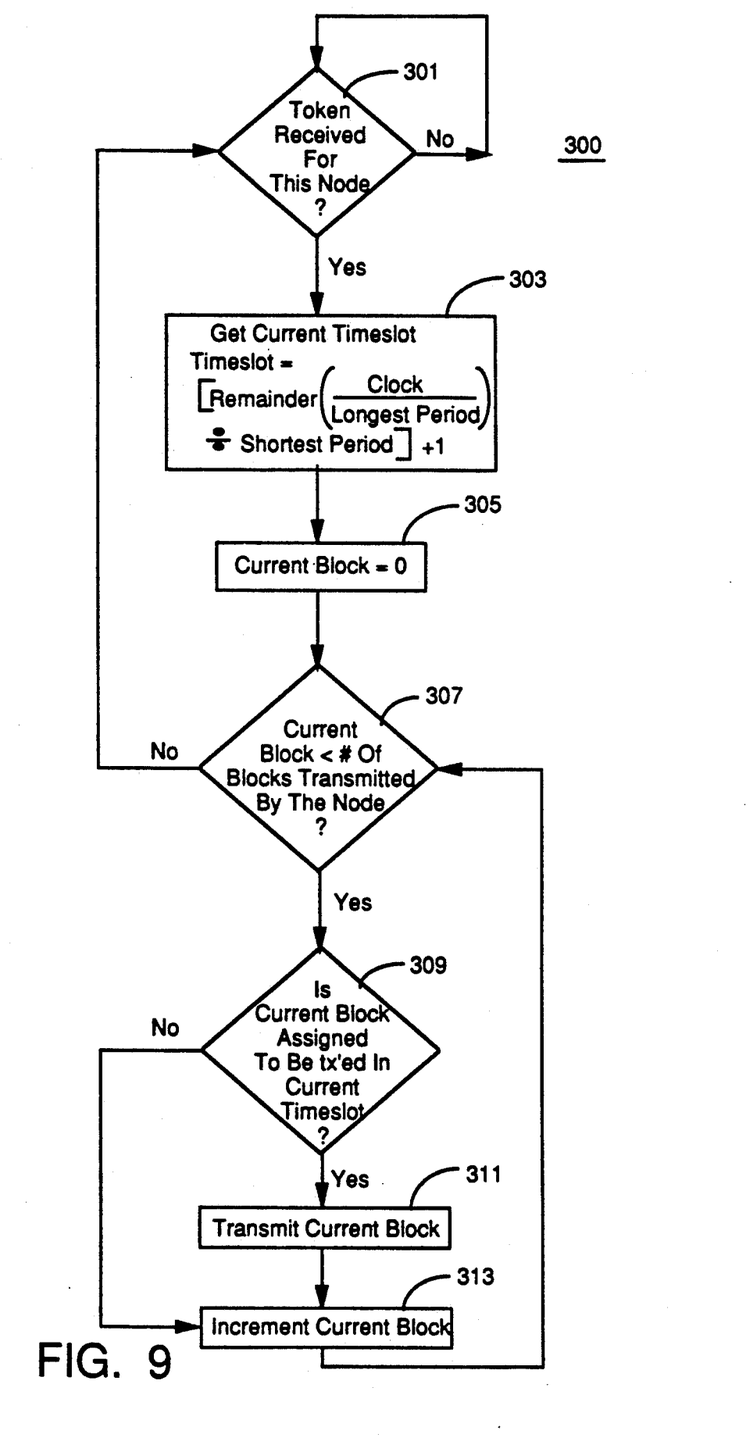
FIG. 9 is a flow chart of a suitable computer program run by each station in transmitting data in the time slots allocated by the server.

FIG. 9 illustrates a flow chart for a suitable program 300 which is run in each station during each transmit time slot for transmitting blocks of data assigned for transmission during the current transmit time slot period. The station waits for receipt of the token at 301. Upon receipt of the token, the current transmit time slot is determined at 303. This can be done, for example, by reading the station's clock, and calculating which smallest period fraction of the longest period the current time represents. A counter of data blocks transmitted from the station is initialized next at 305. Then, for all data blocks transmitted by the station, as determined at 307, a check is made at 309 whether the data block is assigned to be transmitted during the current transmit time slot, and if so, that block of data is transmitted at 311. In either case, the current block counter is incremented at 313. When all of the blocks have been examined for transmission during the current transmit time slot as determined at 307, the station waits for receipt of the token during the next transmit time slot.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A real time data imaging network system comprising:
   a plurality of stations, each generating a plurality of periodic data messages having a plurality of data periods ranging from a longest data period to a shortest data period, with the longest data period being an integer multiple of each of the other data periods;
   a data communications network connecting all of said stations;
   means sequentially enabling, within repetitive transmit time slots, transmission by each station of periodic data messages on said data communications network, said transmit time slots being equal in duration to the shortest data period; and
   means within each station repetitively transmitting, when enabled during every transmit time slot, periodic data messages having the shortest data period, and repetitively transmitting other data messages with longer data periods when enabled during transmit time slots spaced for each other data message by a ratio of the data period for said other periodic data message to the shortest data period, with transmission of said periodic data messages with longer data periods in all stations distributed over transmit time slots occurring during each longest data period to minimize the number of data messages transmitted by all stations during each transmit time slot.

2. The system of claim 1 wherein said periodic data messages are all blocks of data of substantially similar length.

3. The system of claim 2 wherein said data communications network is an FDDI network and wherein said means enabling transmission is a token passed from station to station.

4. The system of claim 1 wherein said data periods comprise a short data period and a long data period, and wherein said means within each station repetitively transmitting, transmits messages with said short data period when enabled during every transmit time slot, and transmits messages with said long data period, when enabled during time slots spaced by the ratio of the long data period to the short data period, with transmission of the periodic data messages with the long data period by the all stations distributed over transmit time slots occurring during each long data period.

5. The system of claim 4 wherein said means enabling transmission is a token passed from station to station.

6. The system of claim 5 wherein said data communications network is an FDDI network.

7. The system of claim 1 including within a designated station, server means assigning said periodic data messages with longer data periods transmitted by each station to said transmit time slots, with said periodic data messages with longer data periods in different stations distributed over transmit time slots occurring during each longest data period to minimize the number of data messages transmitted by all stations during each transmit time slot.

8. The system of claim 7 wherein said server means includes means sequentially assigning periodic data messages from all stations having the same longer data period, a starting transmit time slot, and means assigning each periodic data message to additional time slots spaced by a period transmit spacing equal to a ratio of the data period of the periodic message to the shortest data period, beginning with said starting transmit time slot.

9. The system of claim 7 wherein said server means includes means varying the starting transmit time slot for periodic data messages with said longer data periods from all stations.

10. The system of claim 9 wherein said server means assigns said periodic data messages with said longer data periods to transmit time slots sequentially and wherein said means varying said starting transmit time slots comprises means varying said starting transmit time slots sequentially for periodic data messages with the same longer data periods.

11. The system of claim 10 wherein said means varying said starting transmit time slots sequentially varies the starting transmit time slots sequentially for periodic data messages with the same longer data period from the first transmit time slot up to a periodic transmit spacing for each longer data period.

12. A method of transmitting periodic data messages between a plurality of stations connected by a data communications network, said method comprising the steps of:

assigning to each periodic data message a data period ranging from a shortest to a longest data period, with said longest data period being an integer multiple of all other data periods;

enabling transmission on the data communications network by each station sequentially of periodic data messages during repetitive transmit time slots, with said transmit time slots having a duration equal to the shortest data period; and operating each station to transmit on the data communications network when enabled during each transmit time slot periodic data messages assigned the shortest data period, and transmitting other periodic data messages having longer data periods when enabled during transmit time slots spaced, for each other data message, by a ratio of the data period for said other periodic data message to said shortest data period, with transmission of said periodic data messages with longer data periods in all stations distributed over transmit time slots occurring during each longest data period to minimize the number of data messages transmitted by all stations during each transmit time slot.

13. The method of claim 12 wherein transmission of data messages by each station in sequence is effected by connecting said stations by an FDDI data communications network in a ring configuration and passing a transmission enabling token from station to station during each transmit time slot.

14. The method of claim 13 wherein transmission of said periodic data messages with longer data periods is distributed by designating one of said stations as a server station which assigns said periodic data messages with similar longer data periods in all stations to said transmit time slots.

15. The method of claim 14 wherein transmission of said periodic data messages with longer data periods is distributed by assigning periodic data messages from all stations having the same longer data period sequential starting transmit time slots and assigning each periodic data message to additional time slots.

* * * * *